(12) United States Patent
Akazawa et al.

(10) Patent No.: US 9,097,206 B2
(45) Date of Patent: Aug. 4, 2015

(54) STIRLING ENGINE AND METHOD OF REMOVING IMPURITIES IN A HEAT-TRANSFER TUBE GROUP IN A POWER DEVICE OR A POWER-GENERATING DEVICE WHICH USES A STIRLING ENGINE

(75) Inventors: Teruyuki Akazawa, Shiga (JP); Tsutomu Nakatsuka, Osaka (JP); Taeko Tahara, Nara (JP); Osamu Sakamoto, Osaka (JP)

(73) Assignee: ESTIR CO., LTD., Maibara-shi, Shiga (JP)

( * ) Notice: Subject to any disclaimer, the term of this patent is extended or adjusted under 35 U.S.C. 154(b) by 275 days.

(21) Appl. No.: 13/394,298

(22) PCT Filed: Dec. 9, 2010

(86) PCT No.: PCT/JP2010/007169
§ 371 (c)(1),
(2), (4) Date: Mar. 5, 2012

(87) PCT Pub. No.: WO2011/070787
PCT Pub. Date: Jun. 16, 2011

(65) Prior Publication Data
US 2012/0159944 A1   Jun. 28, 2012

(30) Foreign Application Priority Data
Dec. 9, 2009   (JP) ................. 2009-279218

(51) Int. Cl.
*F02G 1/055*   (2006.01)
*F23J 3/00*   (2006.01)
(Continued)

(52) U.S. Cl.
CPC . *F02G 1/055* (2013.01); *F23J 3/00* (2013.01); *F23J 15/06* (2013.01); *F28D 7/06* (2013.01);
(Continued)

(58) Field of Classification Search
CPC .......... F02G 1/043; F02G 1/05; F02G 1/055; F02G 1/044; F02G 2255/00; F02G 2255/10; F02G 2254/15; F02G 2260/00; F25B 9/08; F01P 11/06; F28G 9/005; F28G 13/005; F23J 3/00; F23J 3/02; F23J 15/06; F23G 2206/202; F23G 2206/203; F28D 21/0003; F28D 21/0014; F28D 7/06; F28D 2021/0026; B08B 7/0064; B08B 7/0071; Y02E 20/12; Y02E 20/363
USPC .......... 60/516–526; 165/95, 5; 134/19, 20, 39
See application file for complete search history.

(56) References Cited

U.S. PATENT DOCUMENTS 4,022,639 A * 5/1977 Ueki ................ 134/2
4,047,972 A * 9/1977 Stumbar et al. ........... 134/2
(Continued)

FOREIGN PATENT DOCUMENTS

DE   102005004007   8/2006
EP   1988352   11/2008
(Continued)

OTHER PUBLICATIONS

Sekiya et al, "Development on 3kW class Sirling engine generator," Eleventh Stirling Engine Cycle Symposium, The Japanese Society of Mechanical Engineers, Nov. 5, 2008, pp. 41-42 (English abstract provided).
(Continued)

*Primary Examiner* — Thomas Denion
*Assistant Examiner* — Xiaoting Hu
(74) *Attorney, Agent, or Firm* — Hamre, Schumann, Mueller & Larson, P.C.

(57) ABSTRACT

The present invention provides a Stirling engine capable of effectively recovering heat from exhaust gas flowing through a flue 42, and capable of connecting a heating portion 10 and a regeneration portion 5 with each other through an operation gas tube without providing a flow passage separating portion 110, and as the removing mode, number of revolutions of the Stirling engine is reduced, an operation of the Stirling engine is stopped, an amount of generated electricity at the Stirling engine is reduced, or the Stirling engine is reversely rotated.

6 Claims, 15 Drawing Sheets

(51) Int. Cl.
*F28G 13/00* (2006.01)
*F28D 21/00* (2006.01)
*F23J 15/06* (2006.01)
*F28F 1/36* (2006.01)
*F28D 7/06* (2006.01)

(52) U.S. Cl.
CPC ........ *F28D 21/0003* (2013.01); *F28D 21/0014* (2013.01); *F28F 1/36* (2013.01); *F28G 13/005* (2013.01); *F02G 2255/00* (2013.01); *F02G 2255/10* (2013.01); *F23G 2206/202* (2013.01); *F23G 2206/203* (2013.01); *F28D 2021/0026* (2013.01); *Y02E 20/12* (2013.01); *Y02E 20/363* (2013.01)

(56) References Cited

U.S. PATENT DOCUMENTS

| | | | | |
|---|---|---|---|---|
| 4,593,748 A | * | 6/1986 | Kramb | 165/51 |
| 4,766,952 A | * | 8/1988 | Onodera | 165/95 |
| 4,869,209 A | * | 9/1989 | Young | 122/379 |
| 6,560,965 B1 | * | 5/2003 | Fukumoto et al. | 60/772 |
| 6,568,169 B2 | * | 5/2003 | Conde et al. | 60/39.6 |
| 6,626,237 B2 | * | 9/2003 | Bergman | 165/232 |
| 2006/0213196 A1 | | 9/2006 | Sukioka | |
| 2009/0095445 A1 | * | 4/2009 | Park et al. | 165/95 |
| 2009/0229792 A1 | * | 9/2009 | Gomez et al. | 165/95 |
| 2009/0250085 A1 | * | 10/2009 | Gaus et al. | 134/56 D |

FOREIGN PATENT DOCUMENTS

| | | |
|---|---|---|
| JP | 62-35046 | 2/1987 |
| JP | 2008014218 A * | 1/2008 |

OTHER PUBLICATIONS

Sekiya et al. "Development on 3kW class Sirling engine generator," Eleventh Stirling Engine Cycle Symposium, The Japanese Society of Mechanical Engineers, Nov. 5, 2008, pp. 41-42 (English abstract provided).

* cited by examiner

STIRLING ENGINE AND METHOD OF REMOVING IMPURITIES IN A HEAT-TRANSFER TUBE GROUP IN A POWER DEVICE OR A POWER-GENERATING DEVICE WHICH USES A STIRLING ENGINE

TECHNICAL FIELD

The present invention relates to a Stirling engine for recovering heat from exhaust gas which flows through a flue.

BACKGROUND TECHNIQUE

To effectively make use of a heat source such as waste heat, biomass, and heat and cold is to solve an environmental problem and an energy problem. A Stirling engine has features that the engine does not select a heat source and the engine can be operated if there is a temperature difference. Therefore, the Stirling engine is suitable for effectively making use of the heat source.

Attention is paid to heat recovery from exhaust gas flowing through a flue as utilization of waste heat, and a Stirling engine suitable for installation of such a flue is proposed (non-patent document 1).

According to non-patent document 1, a heating portion disposed in the flue includes U-shaped tubes laterally arranged in a row. Combustion gas is made to flow perpendicularly to a direction of the row of the U-shaped tubes which function as heaters, thereby uniformizing a heater temperature distribution.

The present inventors figured out the heating portion shown in FIG. 13 by reference to non-patent document 1.

FIG. 13 is a perspective view of an essential portion showing a configuration of the heating portion of the Stirling engine.

As shown in FIG. 13, as the heating portion of the Stirling engine, U-shaped tubes 101, 102, 103, 104 and 105 having difference sizes and similar shapes are disposed on the same plane, and the U-shaped tubes 101, 102, 103, 104 and 105 are laterally arranged in a row. The heating portion shown in FIG. 13 makes combustion gas to flow perpendicularly to a direction of the row of the U-shaped tubes like non-patent document 1 as shown with arrows in FIG. 13. When a pressure loss of exhaust gas at the heating portion of the U-shaped tube does not cause a problem, exhaust gas is made to flow in parallel to the direction of the in the row, more combustion gas is brought into contact with the U-shaped tubes to increase a heat-transfer area, and an amount of heat taken from the heating portion into the engine may be enhanced.

PRIOR ART DOCUMENT

Patent Document

[Non-Patent Document 1] "Eleventh Stirling engine cycle symposium", pages 41 to 42 of lecture dissertation (development research of 3 kW Stirling engine dynamo-electric generator), issued by Incorporated Association, The Japanese Society of Mechanical Engineers on Nov. 5, 2008

SUMMARY OF THE INVENTION

Problem to be Solved by the Invention

In the Stirling engine of this kind, a high temperature space is formed between a displacer piston and the heating portion, and a regeneration portion and a cooling portion are disposed on an outer periphery of the displacer piston. Therefore, if one ends of the U-shaped tubes 101, 102, 103, 104 and 105 are located in the high temperature space of a center region and the other ends are located in the regeneration portion of an outer periphery region, the U-shaped tubes 101, 102, 103, 104 and 105 can be connected directly to the high temperature space and the regeneration portion, and operation gas can smoothly flow.

According to a configuration of the heating portion shown in FIG. 13, however, to connect the one ends of the U-shaped tubes 101, 102, 103, 104 and 105 to the high temperature space and to connect the other ends to the regeneration portion, a flow passage separating portion is required. This point will be described using FIG. 14.

FIG. 14 is a perspective view of the flow passage separating portion of the Stirling engine shown in FIG. 13 as viewed from a side of the heating portion.

A flow passage separating portion 110 includes a first opening 110A and a second opening 110B which are in communication with the heating portion. The first opening 110A is formed in an inner peripheral side of the heating portion, and the second opening 110B is formed in an outer peripheral side of the heating portion. If the heating portion is divided into two portions, the first opening 110A is formed in one of the portions and the second opening 110B is formed in the other portion.

The U-shaped tubes 101 are located in one end openings 101X and the other end openings 101Y, the U-shaped tubes 102 are located in one end openings 102X and the other end openings 102Y, the U-shaped tubes 103 are located in one end openings 103X and the other end openings 103Y, the U-shaped tubes 104 are located in one end openings 104X and the other end openings 104Y, and the U-shaped tubes 105 are located in one end openings 105X and the other end openings 105Y.

In FIG. 14, the one end openings 103X of the U-shaped tubes 103, the one end openings 104X of the U-shaped tubes 104, and the one end openings 105X of the U-shaped tubes 105 are located in the first opening 110A. The other end openings 101Y of the U-shaped tubes 101 and the other end openings 102Y of the U-shaped tubes 102 are located in the second opening 110B. The one end openings 101X of the U-shaped tubes 101, the one end openings 102X of the U-shaped tubes 102, the other end openings 103Y of the U-shaped tubes 103, the other end openings 104Y of the U-shaped tubes 104, and the other end openings 105Y of the U-shaped tubes 105 are not brought into communication with the heating portion through the flow passage separating portion 110, and they are connected to a regeneration portion from an outer peripheral end of the flow passage separating portion 110.

According to the Stirling engine shown in FIG. 13, one ends of the U-shaped tubes 101, 102, 103, 104 and 105 can be connected to the high temperature space and the other ends thereof can be connected to the regeneration portion by providing the flow passage separating portion 110 shown in FIG. 14.

Although non-patent document 1 does not disclose the flow passage separating portion, if a member corresponding to the flow passage separating portion 110 shown in FIG. 13 does not exist, operation gas cannot flow between the high temperature space and the regeneration portion.

When such a flow passage separating portion 110 is provided, a resistance is generated against a flow of operation gas, and it is necessary to take, into consideration, an influence generated by non-uniform flow on the high temperature space and the regeneration portion.

Hence, it is an object of the present invention to provide a Stirling engine capable of effectively recovering heat from exhaust gas flowing through a flue, and capable of connecting the heating portion and the regeneration portion with each other through an operation gas tube without providing a flow passage separating portion.

A first aspect of the present invention provides a Stirling engine and method of removing impurities in a heat-transfer tube group in a power device or a power-generating device which uses a Stirling engine, comprising a displacer piston and a power piston, in which a space is divided into two spaces by the displacer piston, one of the spaces is a high temperature space, and the other space is a low temperature space, a heating portion is disposed at a position opposed to the displacer piston across the high temperature space, a regeneration portion and a cooling portion are disposed on an outer periphery of the displacer piston, heat-transfer tubes configuring the heating portion are disposed in a flue, operation gas is heated and expanded in the heat-transfer tubes, the operation gas is cooled and contracted in the cooling portion, and the operation gas is moved between the high temperature space and the low temperature space, wherein a removing mode of impurities such as carbon included in exhaust gas which flows through the flue is carried out when the impurities adhere to the heat-transfer tubes, and as the removing mode, number of revolutions of the Stirling engine is reduced, an operation of the Stirling engine is stopped, an amount of generated electricity at the Stirling engine is reduced, or the Stirling engine is reversely rotated.

A second aspect of the present invention provides a Stirling engine and method of removing impurities in a heat-transfer tube group in a power device or a power-generating device which uses a Stirling engine, comprising a displacer piston and a power piston, in which a space is divided into two spaces by the displacer piston, one of the spaces is a high temperature space, and the other space is a low temperature space, a heating portion is disposed at a position opposed to the displacer piston across the high temperature space, a regeneration portion and a cooling portion are disposed on an outer periphery of the displacer piston, heat-transfer tubes configuring the heating portion are disposed in a flue, operation gas is heated and expanded in the heat-transfer tubes, the operation gas is cooled and contracted in the cooling portion, and the operation gas is moved between the high temperature space and the low temperature space, wherein a removing mode of impurities such as carbon included in exhaust gas which flows through the flue is carried out when the impurities adhere to the heat-transfer tubes, and as the removing mode, a flow rate of exhaust gas which flows through an exhaust gas flow passage is increased for predetermined time.

A third aspect of the present invention provides a Stirling engine and method of removing impurities in a heat-transfer tube group in a power device or a power-generating device which uses a Stirling engine, comprising a displacer piston and a power piston, in which a space is divided into two spaces by the displacer piston, one of the spaces is a high temperature space, and the other space is a low temperature space, a heating portion is disposed at a position opposed to the displacer piston across the high temperature space, a regeneration portion and a cooling portion are disposed on an outer periphery of the displacer piston, heat-transfer tubes configuring the heating portion are disposed in a flue, operation gas is heated and expanded in the heat-transfer tubes, the operation gas is cooled and contracted in the cooling portion, and the operation gas is moved between the high temperature space and the low temperature space, wherein an insertion port through which high pressure air or cleaning water is introduced is provided in the flue, a removing mode of impurities such as carbon included in exhaust gas which flows through the flue is carried out when the impurities adhere to the heat-transfer tubes, and as the removing mode, the high pressure air or the cleaning water is supplied from the insertion port to the heat-transfer tubes.

According to a forth aspect of the invention, in the Stirling engine and method of removing impurities in a heat-transfer tube group in a power device or a power-generating device which uses a Stirling engine of any one of the first to third aspects, wherein number of revolutions of the Stirling engine is reduced, an operation of the Stirling engine is stopped, an amount of generated electricity at the Stirling engine is reduced, the Stirling engine is reversely rotated, a flow rate of the exhaust gas is increased, or high pressure air or cleaning water is supplied from the insertion port to the heat-transfer tubes, by detecting a reduction in temperature of the heat-transfer tubes.

Effect of the Invention

According to the invention, since the parallel exhaust gas flow passages are formed between the respective U-shaped tubes, it is possible to efficiently heat the U-shaped tubes. The first through holes are formed closer to the center region of the heating portion head as compared with the second through holes, the one ends of the U-shaped tubes are mounted in the first through holes, and the other ends of the U-shaped tubes are mounted in the second through holes. According to this, operation gas can flow between the high temperature space and the regeneration portion through the U-shaped tubes, and the resistance in the flow passage can be reduced.

Figure 1:
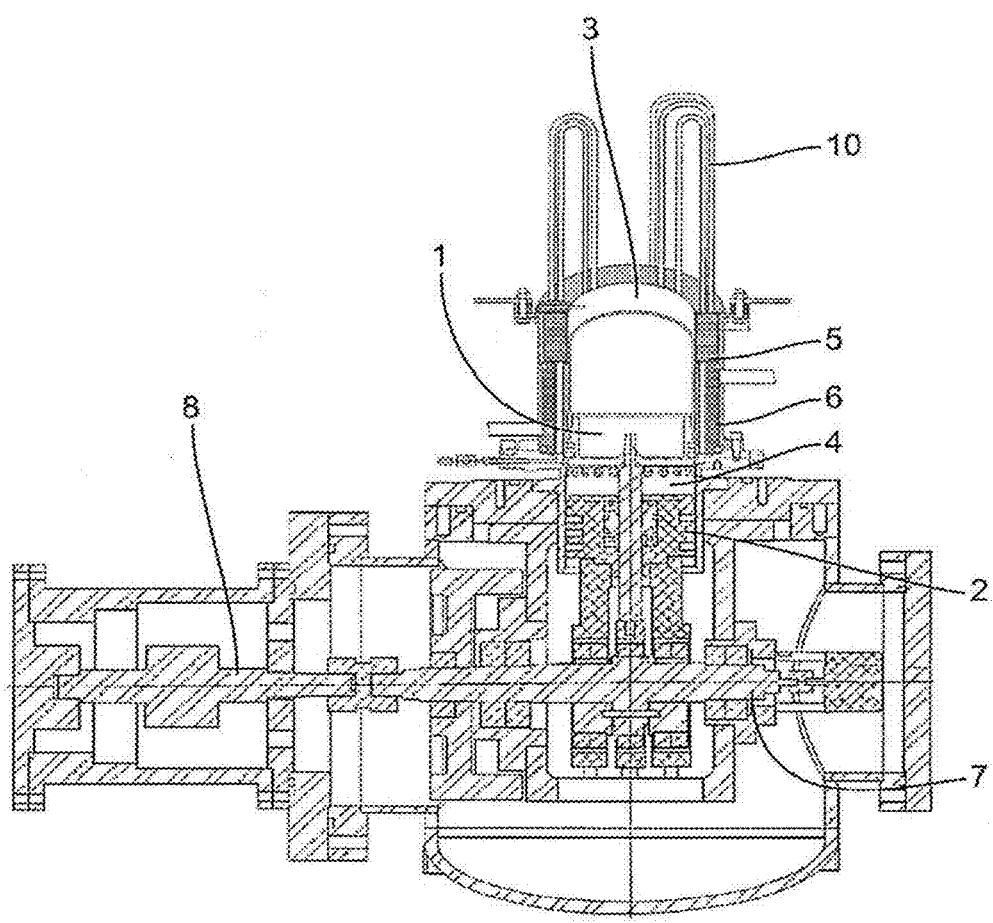
FIG. 1 is a sectional view showing a configuration of a Stirling engine according to an embodiment of the present invention.

EXPLANATION OF SYMBOLS 1 displacer piston
2 power piston
3 high temperature space
4 low temperature space
5 regeneration portion
6 cooling portion
7 crankshaft
8 electricity-generating shaft
10 heating portion

MODE FOR CARRYING OUT THE INVENTION

According to the Stirling engine and method of removing impurities in a heat-transfer tube group in a power device or a power-generating device which uses a Stirling engine of the first aspect of the invention, a removing mode of impurities such as carbon included in exhaust gas which flows through the flue is carried out when the impurities adhere to the heat-transfer tubes, and as the removing mode, number of revolutions of the Stirling engine is reduced, an operation of the Stirling engine is stopped, an amount of generated electricity at the Stirling engine is reduced, or the Stirling engine is reversely rotated. With this aspect, it is possible to rise a temperature in a heat-transfer tube, and to peel off impurities which adhere to the heat-transfer tube.

According to the Stirling engine and method of removing impurities in a heat-transfer tube group in a power device or a power-generating device which uses a Stirling engine of the second aspect of the invention, a removing mode of impurities such as carbon included in exhaust gas which flows through the flue is carried out when the impurities adhere to the heat-transfer tubes, and as the removing mode, a flow rate of exhaust gas which flows through an exhaust gas flow passage is increased for predetermined time. With this aspect, it is possible to blow away impurities which adhere to the heat-transfer tube by temporarily and abruptly increasing a flow rate of the exhaust gas.

According to the Stirling engine and method of removing impurities in a heat-transfer tube group in a power device or a power-generating device which uses a Stirling engine of the third aspect of the invention, an insertion port through which high pressure air or cleaning water is introduced is provided in the flue, a removing mode of impurities such as carbon included in exhaust gas which flows through the flue is carried out when the impurities adhere to the heat-transfer tubes, and as the removing mode, the high pressure air or the cleaning water is supplied from the insertion port to the heat-transfer tubes. With this aspect, it is possible to remove impurities which adhere to the heat-transfer tubes of the heating portion.

According to the forth aspect of the invention, in the Stirling engine and method of removing impurities in a heat-transfer tube group in a power device or a power-generating device which uses a Stirling engine of any one of first to third aspects, number of revolutions of the Stirling engine is reduced, an operation of the Stirling engine is stopped, an amount of generated electricity at the Stirling engine is reduced, the Stirling engine is reversely rotated, a flow rate of the exhaust gas is increased, or high pressure air or cleaning water is supplied from the insertion port to the heat-transfer tubes, by detecting a reduction in temperature of the heat-transfer tubes. With this aspect, it is possible to reliably carry out removing timing of impurities of the heat-transfer tubes during usage.

EMBODIMENTS

A Stirling engine according to an embodiment of the present invention will be described below.

An outline configuration of the Stirling engine will first be described using FIG. 1.

FIG. 1 is a sectional view showing a configuration of the Stirling engine of the embodiment.

As shown in FIG. 1, the Stirling engine of the embodiment includes a displacer piston 1 and a power piston 2. A space is divided into two spaces by the displacer piston 1, one of the spaces is defined as a high temperature space 3, and the other space is defined as a low temperature space 4. Operation gas is made to move between the high temperature space 3 and the low temperature space 4. According to the Stirling engine of the embodiment, a heating portion 10 is installed in a heat source gas flow passage through which exhaust gas generated from a shipboard diesel engine is discharged out for example.

The heating portion 10 is located at a position opposed to the displacer piston 1 across the high temperature space 3, and a regeneration portion 5 and a cooling portion 6 are disposed on an outer periphery of the displacer piston 1.

The displacer piston 1 and the power piston 2 are connected to a crankshaft 7, and an electricity-generating shaft 8 is connected to one end of the crankshaft 7.

The regeneration portion 5 is formed into a cylindrical shape, and a metallic mesh heat storage material such as austenitic stainless steel and brass is provided in the regeneration portion 5. Heat is absorbed from high temperature operation gas by the heat storage material, and heat is radiated to a low temperature operation gas.

The cooling portion 6 is also formed into a cylindrical shape, the cooling portion 6 is divided into a passage through which cooling water flows and a passage through which operation gas flows, and the operation gas is cooled by the cooling water.

The heating portion 10 is connected to the regeneration portion 5, and the regeneration portion 5 is connected to the cooling portion 6. The heating portion 10 is in communication with the high temperature space 3, and the cooling portion 6 is in communication with the low temperature space 4.

In the above-described configuration, the displacer piston 1 is operated using an electricity-generator as a power source at the time of a starting operation, and operation gas moves through the high temperature space 3 and the low temperature space 4. The operation gas is heated and expanded by the heating portion 10, and is introduced into the high temperature space 3, the operation gas is cooled and contracted by the cooling portion 6, and is introduced into the low temperature space 4. According to this, a pressure variation is generated in the high temperature space 3 and the low temperature space 4. By this pressure variation, the power piston 2 is operated and an output can be obtained.

That is, the operation gas is heated by the heating portion 10, the filled operation gas is expanded, a pressure difference is received, and the displacer piston 1 is moved downward. By the downward movement of the displacer piston 1, gas existing in the low temperature space 4 between the displacer piston 1 and the power piston 2 is compressed to move the power piston 2 downward. By the downward movement of the power piston 2, the operation gas passes through the heating portion 10, the regeneration portion 5 and the cooling portion 6 from an upper portion (high temperature space 3) of the displacer piston 1, and moves into a lower portion (low temperature space 4) of the displacer piston 1. By upward movement of the displacer piston 1, a pressure in the low temperature space 4 between the displacer piston 1 and the power piston 2 is reduced and according to this, the power piston 2 moves upward. The operation gas which moved to the lower portion of the displacer piston 1 passes through the cooling portion 6, the regeneration portion 5 and the heating portion 10 by upward movement of the power piston 2, and the operation gas moves to the upper portion of the displacer piston 1.

As described above, the operation gas is heated by the heating portion 10 and cooled by the cooling portion 6, and thus, the operation gas is expanded and contracted. In this state, the operation gas reciprocates between the upper portion and the lower portion of the displacer piston 1, the displacer piston 1 is moved and the power piston 2 is moved, thereby generating electricity.

Next, a configuration of the heating portion of the Stirling engine will be described using FIGS. 2 to 5.

Figure 2:
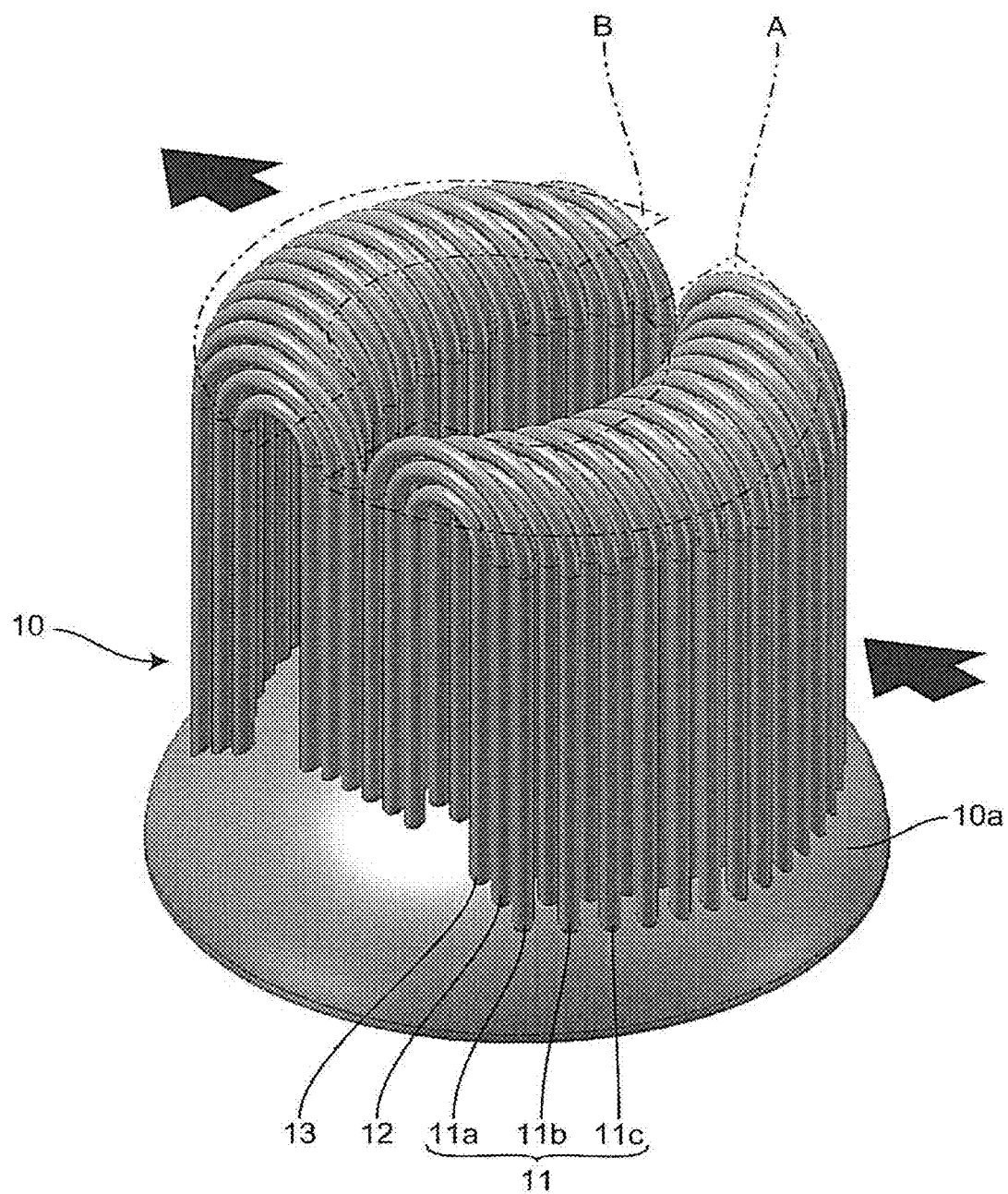
FIG. 2 is a perspective view showing a configuration of a heating portion of the Stirling engine.
Figure 3:
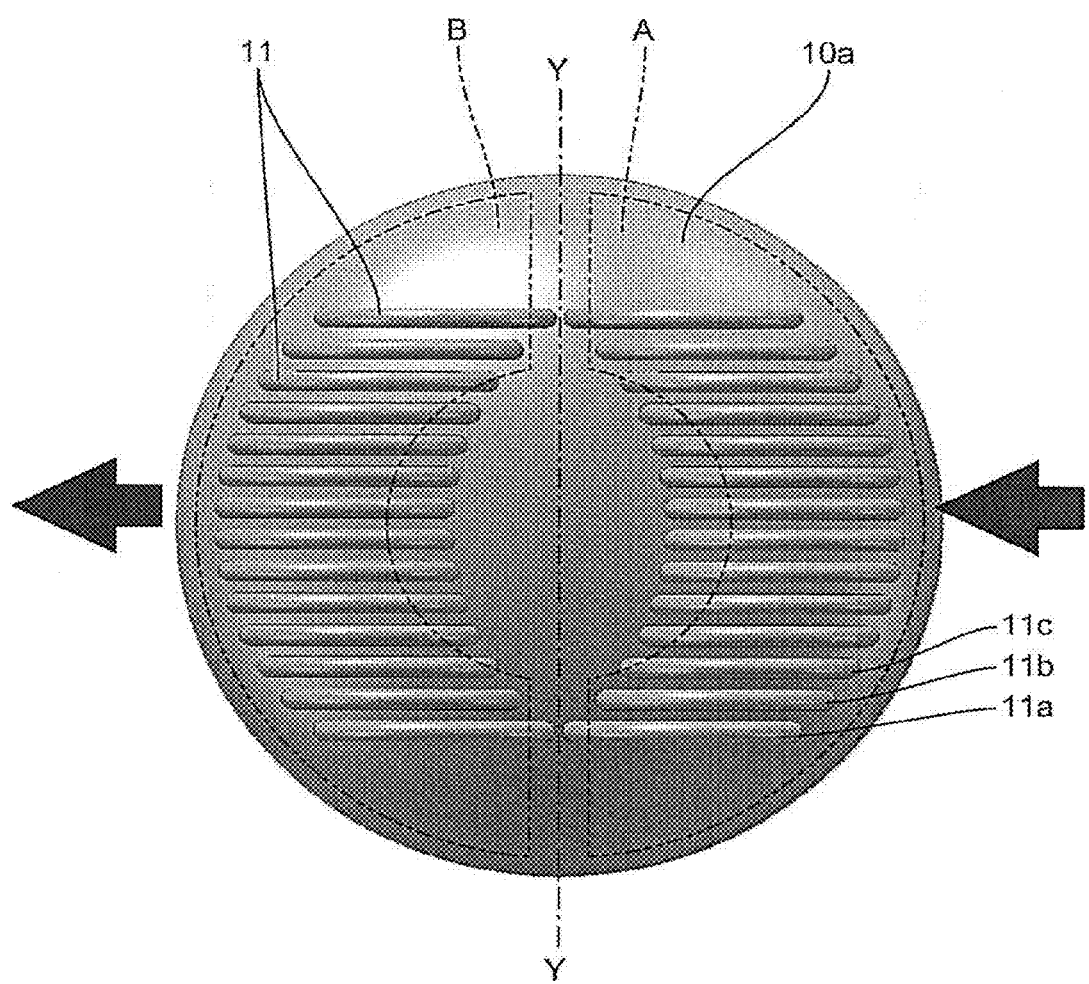
FIG. 3 is a plan view of the heating portion.
Figure 4:
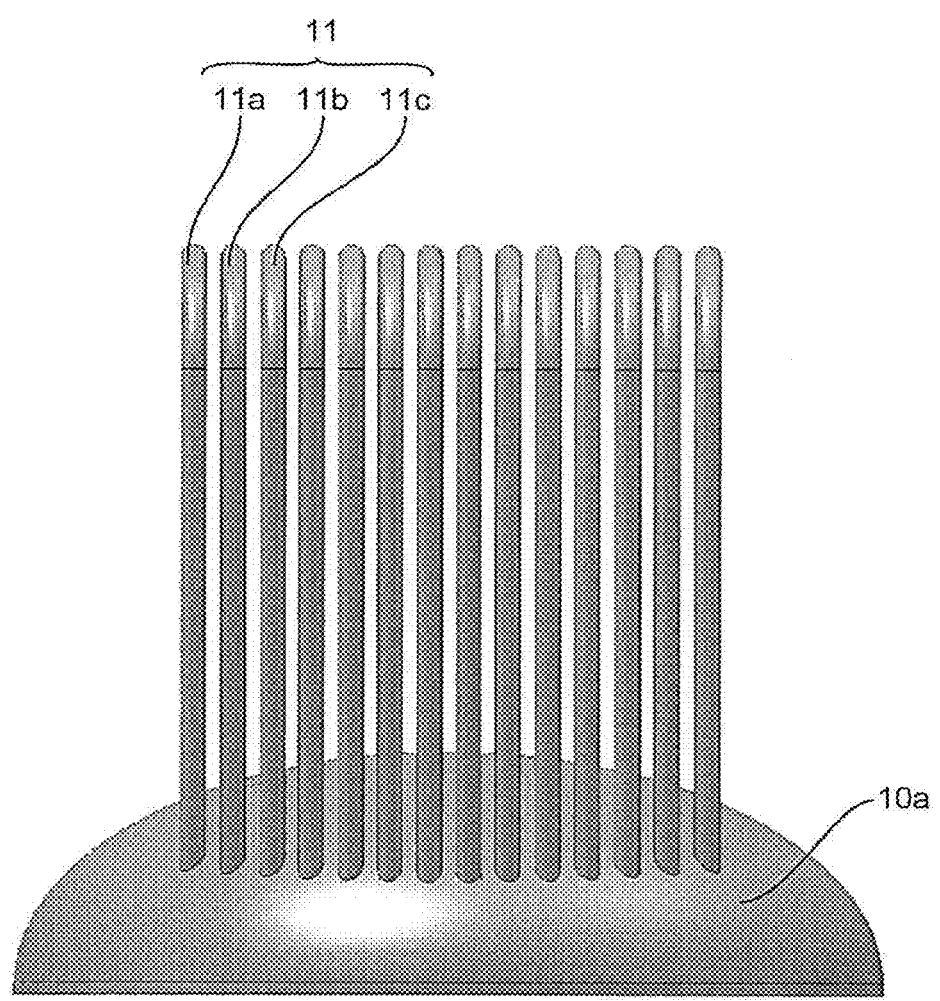
FIG. 4 is a side view of the heating portion.
Figure 5:
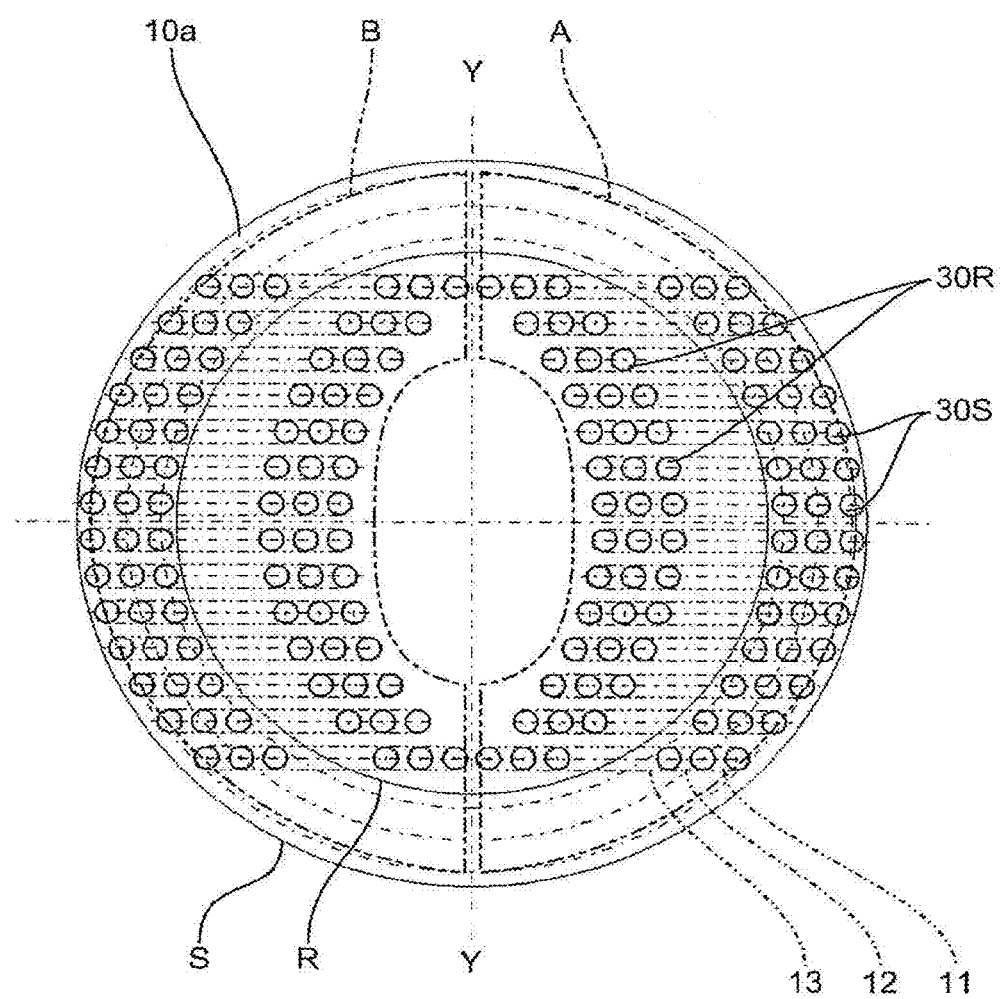
FIG. 5 is a bottom view of the heating portion.

FIG. 2 is a perspective view showing the configuration of the heating portion of the Stirling engine. FIG. 3 is a plan view of the heating portion. FIG. 4 is a side view of the heating portion. FIG. 5 is a bottom view of the heating portion.

As shown in these drawings, the heating portion 10 of the Stirling engine according to the embodiment includes a heating portion head 10a and U-shaped tubes 11, 12 and 13. The heating portion head 10a is formed into a spherical shape whose outer surface is convex and whose inner surface is concave. The U-shaped tubes 11, 12 and 13 are mounted on the outer surface of the heating portion head 10a. A plurality of through holes are formed in the heating portion head 10a as shown in FIG. 5. The U-shaped tubes 11, 12 and 13 are fixed to the through holes.

A first heat-transfer tube group A located on an upstream side of flow of exhaust gas and a second heat-transfer tube group B located on a downstream side of the flow of the exhaust gas are formed on the heating portion head 10a. As shown in FIGS. 3 and 5, the first heat-transfer tube group A and the second heat-transfer tube group B are provided symmetrically with respect to a division phantom line Y of the heating portion head 10a as viewed from above. By providing the first heat-transfer tube group A and the second heat-transfer tube group B symmetrically in this manner, a heating amount can be increased.

Arrangement of the U-shaped tubes 11, 12 and 13 of the first heat-transfer tube group A will be described below.

The first heat-transfer tube group A includes the U-shaped tubes 11, 12 and 13 having different sizes and similar shapes, and the U-shaped tubes 11, 12 and 13 are disposed on the same plane. The U-shaped tubes 11, 12 and 13 are arranged in the direction of the row. For example, the U-shaped tubes 11 comprise a plurality of U-shaped tubes 11a, 11b, 11c . . . having the same shapes and sizes arranged in the direction of the row.

First through holes 30R which are in communication with the high temperature space 3 are formed in a center region R of the heating portion head 10a, and second through holes 30S which are in communication with the regeneration portion 5 are formed in an outer peripheral region S of the heating portion head 10a. The second through holes 30S are disposed in a form of arcs. In this embodiment, since three kinds of U-shaped tubes 11, 12 and 13 having different sizes are used, three arcs are formed. As shown in FIG. 5, the first through holes 30R and the second through holes 30S are arranged in three rows (inner row, intermediate row and outer row). A distance between one of the first through holes 30R existing in the inner row and one of the second through holes 30S existing in the inner row at the corresponding location, a distance between one of the first through holes 30R existing in the intermediate row and one of the second through holes 30S in the intermediate row at the corresponding location, and a distance between one of the first through holes 30R existing in the outer row and one of the second through holes 30S existing in the outer row at the corresponding location are equal to each other. The first through holes 30R in the same row (inner row, intermediate row and outer row) are disposed in a form of an arc having the same curvature as that of the second through holes 30S existing in the corresponding row. One ends of the U-shaped tubes 11, 12 and 13 are mounted in the first through holes 30R, and the other ends of the U-shaped tubes 11, 12 and 13 are mounted in the second through holes 30S.

According to the embodiment, since parallel exhaust gas flow passages are formed between the respective U-shaped tubes 11a, 11b, 11c . . . , it is possible to efficiently heat the U-shaped tubes 11a, 11b, 11c . . . . The first through holes 30R are formed closer to the center region R of the heating portion head 10a as compared with the second through holes 30S, one ends of the U-shaped tubes 11a, 11b, 11c . . . are mounted in the first through holes 30R, and the other ends of the U-shaped tubes 11a, 11b, 11c . . . are mounted in the second through holes 30S. According to this, since operation gas can flow between the high temperature space 3 and the regeneration portion 5 through the U-shaped tubes 11a, 11b, 11c . . . , a flow passage resistance can be reduced.

Since the U-shaped tubes 11, 12 and 13 having different sizes are disposed on the same plane, a heating amount can further be increased.

Figure 6:
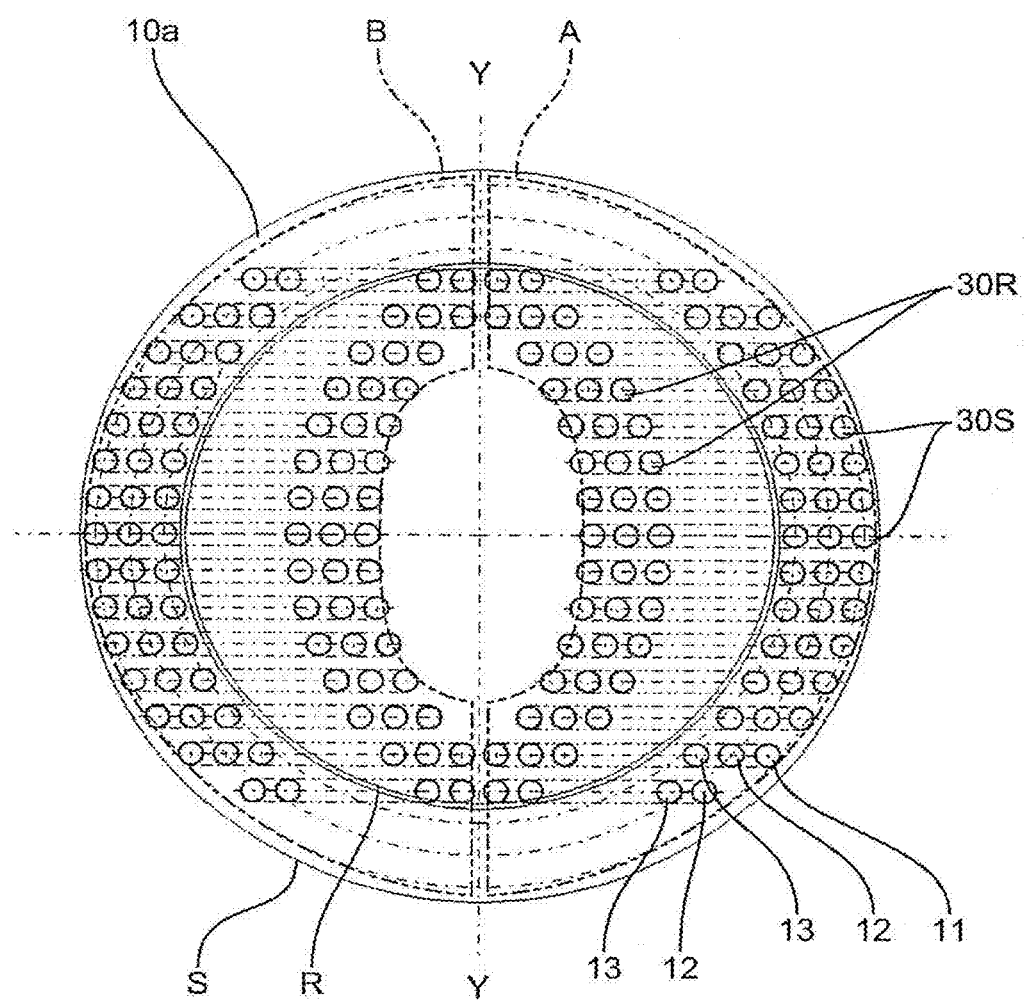
FIG. 6 is a bottom view showing another embodiment of the heating portion of the Stirling engine.

FIG. 6 is a bottom view showing another embodiment of the heating portion of the Stirling engine.

In FIG. 5, three U-shaped tubes 11, 12 and 13 are located on both ends of in the first heat-transfer tube group A and the second heat-transfer tube group B. According to a configuration shown in FIG. 6, there exist only two U-shaped tubes 12 and 13 on both ends of in the first heat-transfer tube group A and the second heat-transfer tube group B. Since the first heat-transfer tube group A and the second heat-transfer tube group B are provided symmetrically with respect to the division phantom line Y, the U-shaped tubes 12 and 13 are effectively disposed in the outer peripheral region S having a shorter distance from the division phantom line Y in this embodiment, and the heating amount is increased. In the previous embodiment, in any positions, the three U-shaped tubes 11, 12 and 13 are disposed, but in both ends, two U-shaped tubes 12 and 13 can be disposed on both the ends as in the present embodiment. Although the number of tubes is changed on both ends as in the present embodiment, the number of tubes disposed at an intermediate position may be changed.

Another embodiment of the heating portion of the Stirling engine will be described using FIGS. 7 to 11.

Figure 7:
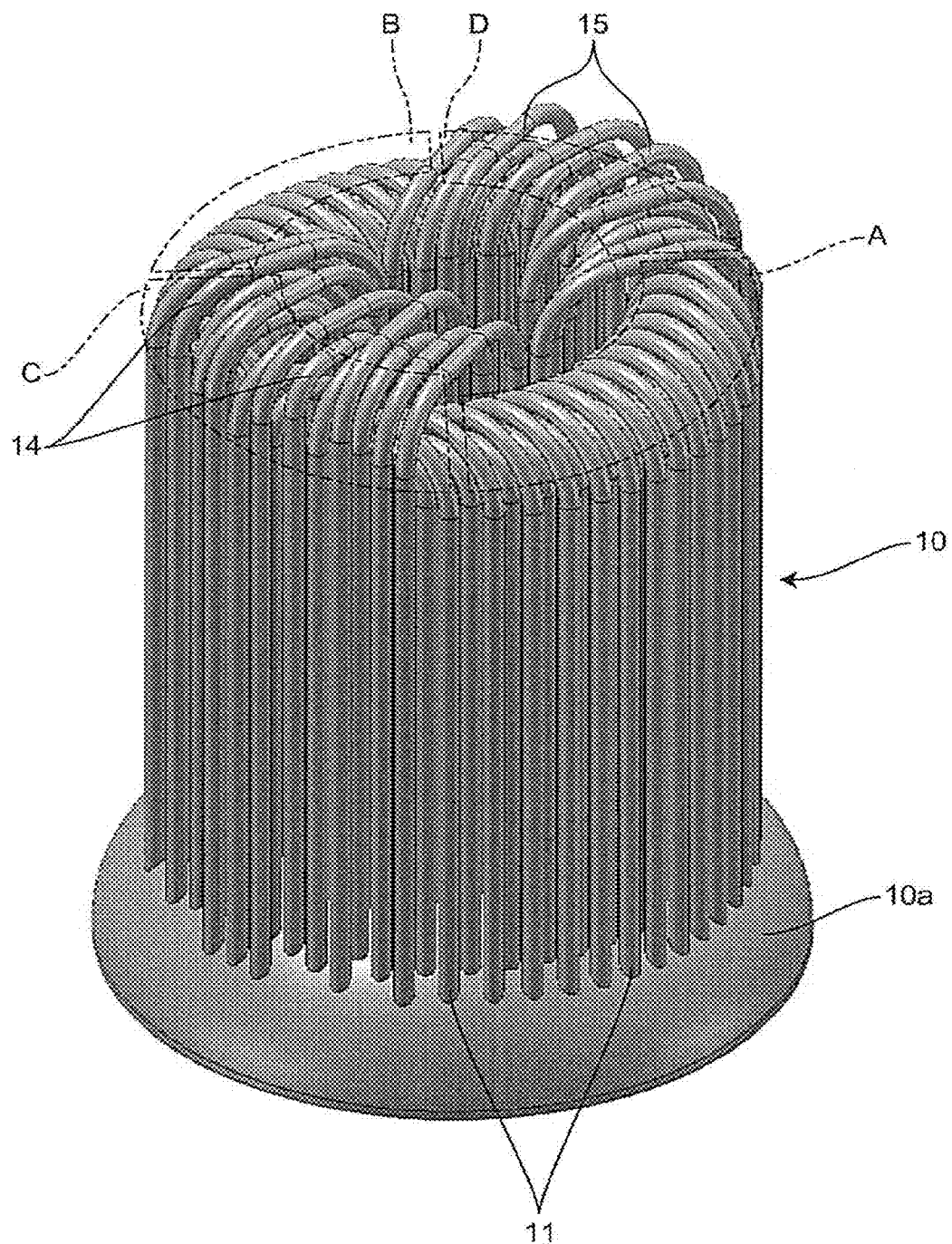
FIG. 7 is a perspective view showing another embodiment of the heating portion of the Stirling engine.
Figure 8:
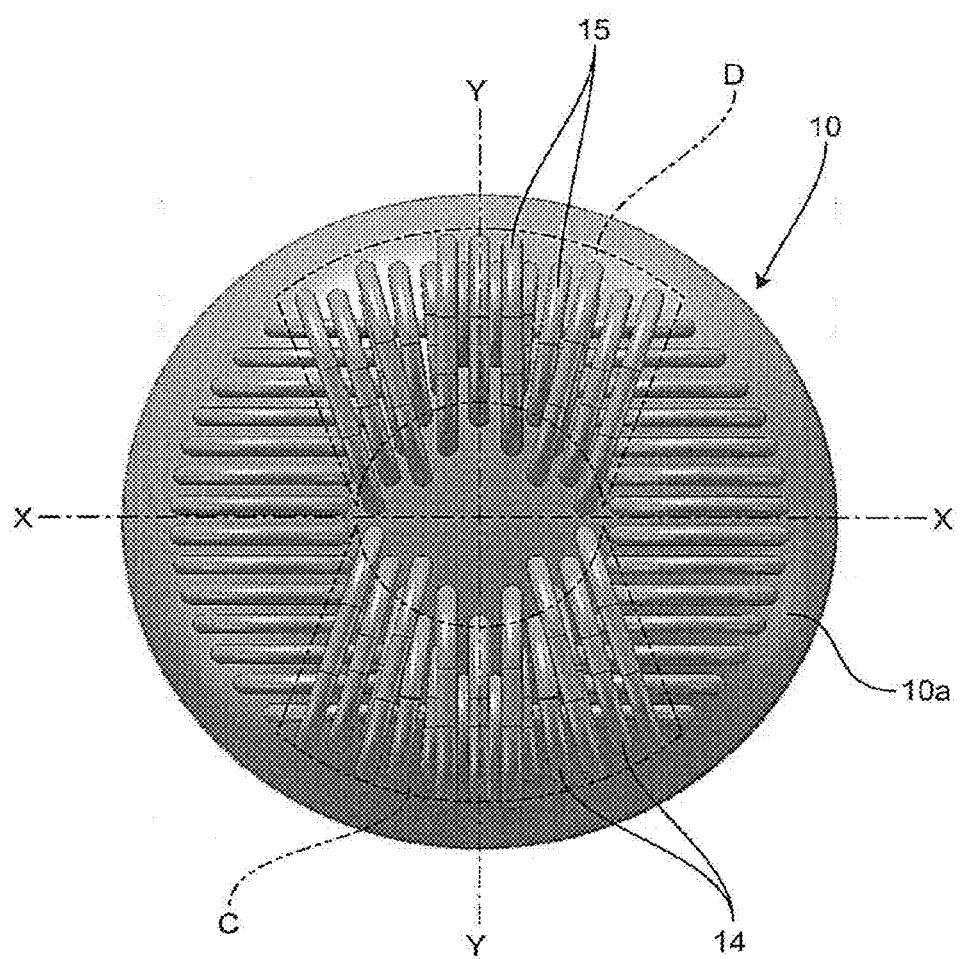
FIG. 8 is a plan view of the heating portion.
Figure 9:
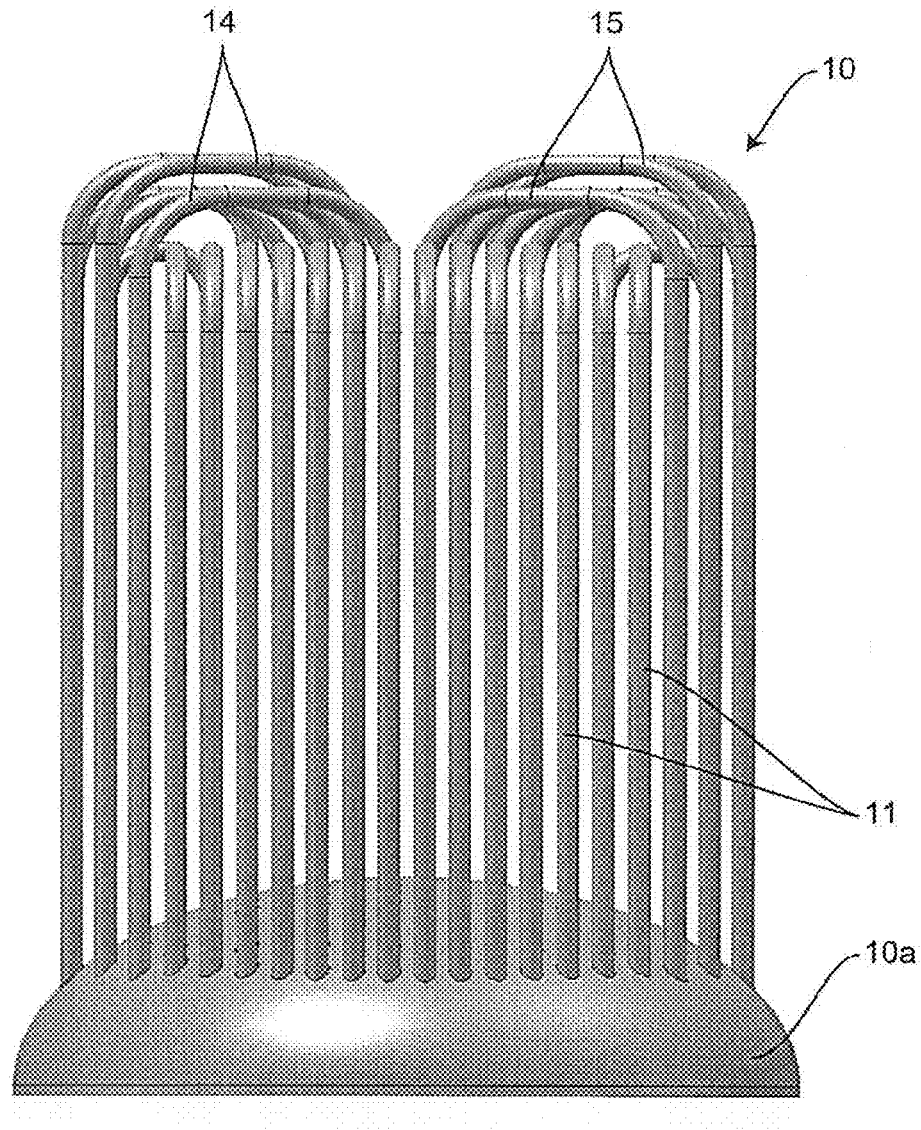
FIG. 9 is a side view of the heating portion.
Figure 10:
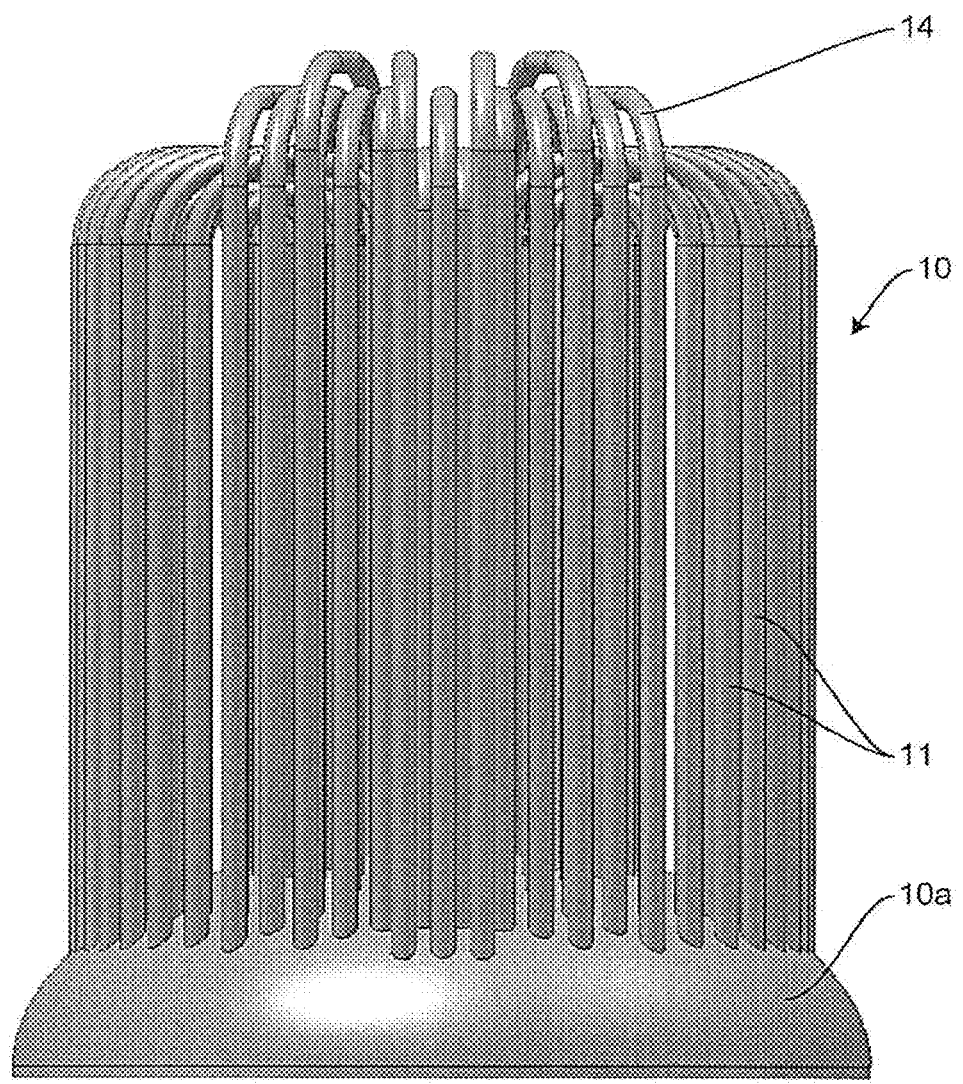
FIG. 10 is a front view of the heating portion.
Figure 11:
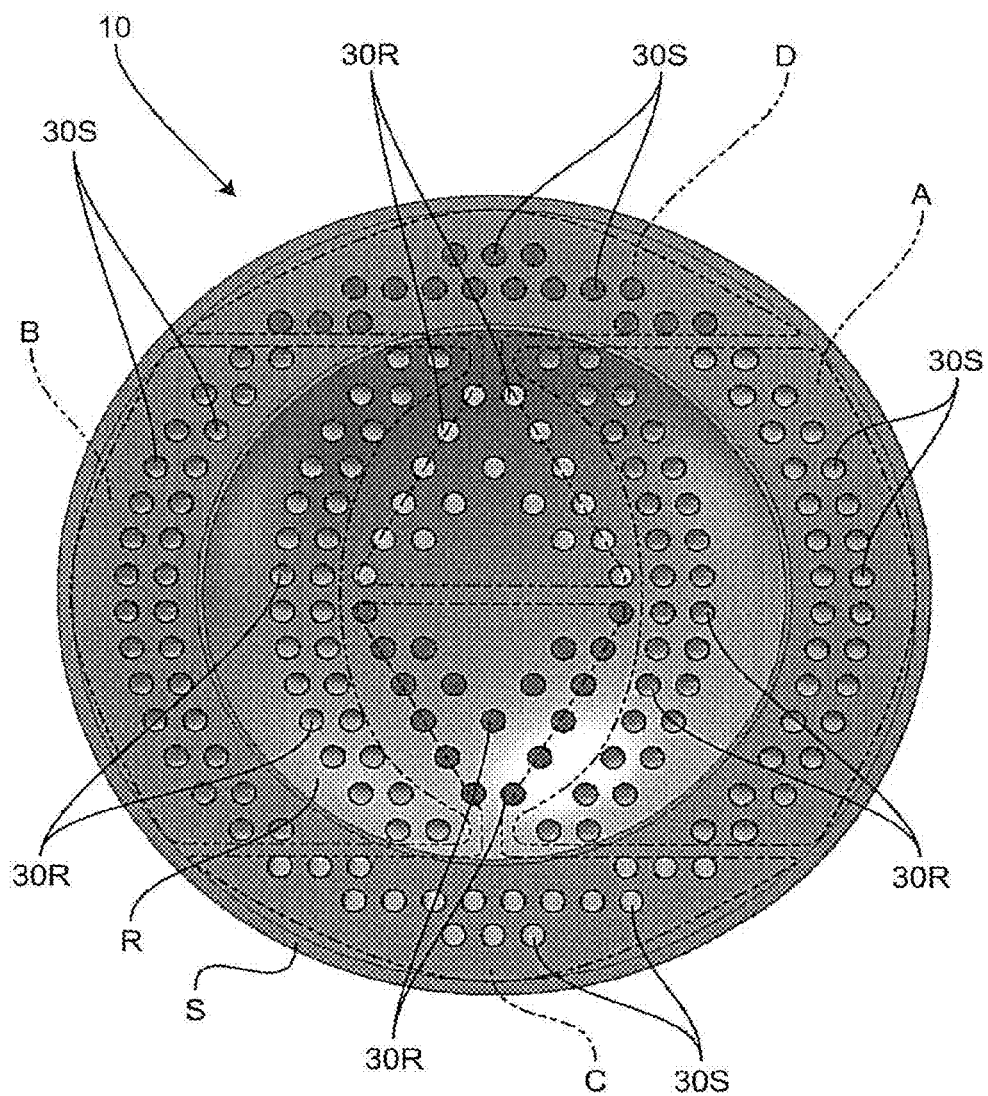
FIG. 11 is a bottom view of the heating portion.

FIG. 7 is a perspective view showing a configuration of the heating portion of the Stirling engine of the embodiment. FIG. 8 is a plan view of the heating portion. FIG. 9 is a side view of the heating portion. FIG. 10 is a front view of the heating portion. FIG. 11 is a bottom view of the heating portion.

The same functions as those of the previous embodiment are designated with the same symbols, and explanation thereof will be omitted.

A heating portion 10 of this embodiment includes a heating portion head 10a, and the heating portion head 10a includes a third heat-transfer tube group C and a fourth heat-transfer tube group D. A plurality of U-shaped tubes 14 configuring the third heat-transfer tube group C and a plurality of U-shaped tubes 15 configuring the fourth heat-transfer tube group D are provided symmetrically with respect to a division phantom line X of the heating portion head 10a as viewed from above. The division phantom line X is a phantom line which intersects with the division phantom line Y at right angles. The U-shaped tubes 14 and 15 configuring the third heat-transfer tube group C and the fourth heat-transfer tube group D are formed large so that they upwardly straddle the U-shaped tubes 11, 12 and 13 which configure the first heat-transfer tube group A and the second heat-transfer tube group B.

According to the present embodiment, since the third heat-transfer tube group C and the fourth heat-transfer tube group D are further provided, it is possible to increase the heating amount.

According to the embodiment, it is possible to further increase the heating amount while maintaining the exhaust gas flow passages formed by the first heat-transfer tube group A and the second heat-transfer tube group B.

The first through holes 30R which are in communication with the high temperature space 3 are formed inn the center region R of the heating portion head 10a, and the second through holes 30S which are in communication with the regeneration portion 5 are formed in the outer peripheral region S of the heating portion head 10a. The second through holes 30S which corresponds to the first heat-transfer tube group A and the second heat-transfer tube group B are disposed in a form of arcs. In this embodiment, two kinds of U-shaped tubes having different sizes are used for the first heat-transfer tube group A and the second heat-transfer tube group B, and two arcs are formed by the through holes in the outer peripheral regions S which correspond to the first heat-transfer tube group A and the second heat-transfer tube group B. As shown in FIG. 6, the first through holes 30R and the second through holes 30S corresponding to the first heat-transfer tube group A and the second heat-transfer tube group B are basically arranged in three rows. (inner row, intermediate row and outer row). A distance between one of the first through holes 30R existing in the inner row and one of the second through holes 30S existing in the inner row at the corresponding location, a distance between one of the first through holes 30R existing in the intermediate row and one of the second through holes 30S in the intermediate row at the corresponding location, and a distance between one of the first through holes 30R existing in the outer row and one of the second through holes 30S existing in the outer row at the corresponding location are equal to each other. The first through holes 30R in the same row (inner row, intermediate row and outer row) are disposed in a form of an arc having the same curvature as that of the second through holes 30S existing in the corresponding row. In this embodiment, the second through holes 30S which correspond to the third heat-transfer tube group C and the fourth heat-transfer tube group D are disposed in the outer peripheral region S of the heating portion head 10a between the second through holes 30S of the first heat-transfer tube group A and the second through holes 30S of the second heat-transfer tube group B. The first through holes 30R corresponding to the third heat-transfer tube group C and the fourth heat-transfer tube group D are disposed in the center region R of the heating portion head 10a between the first through holes 30R of the first heat-transfer tube group A and the first through holes 30R of the second heat-transfer tube group B.

In this embodiment, as apparent from comparison in FIG. 5 or 6, it is possible to increase the first through holes 30R in the center region R of the heating portion head 10a and the second through holes 30S in the outer peripheral region S, a flowing amount of the high temperature space 3 and the regeneration portion 5 can be increased and uniform flowing can be realized. Non-uniform degrees in the regenerator are moderated by internal gas flow caused by the second through holes 30S which are connected to upper and lower regenerators of a phantom axis Y. According to this, it is possible to reduce a reheating loss and to enhance the performance.

Another embodiment of the U-shaped tubes configuring the heating portion of the Stirling engine will be described using FIG. 12.

Figure 12:
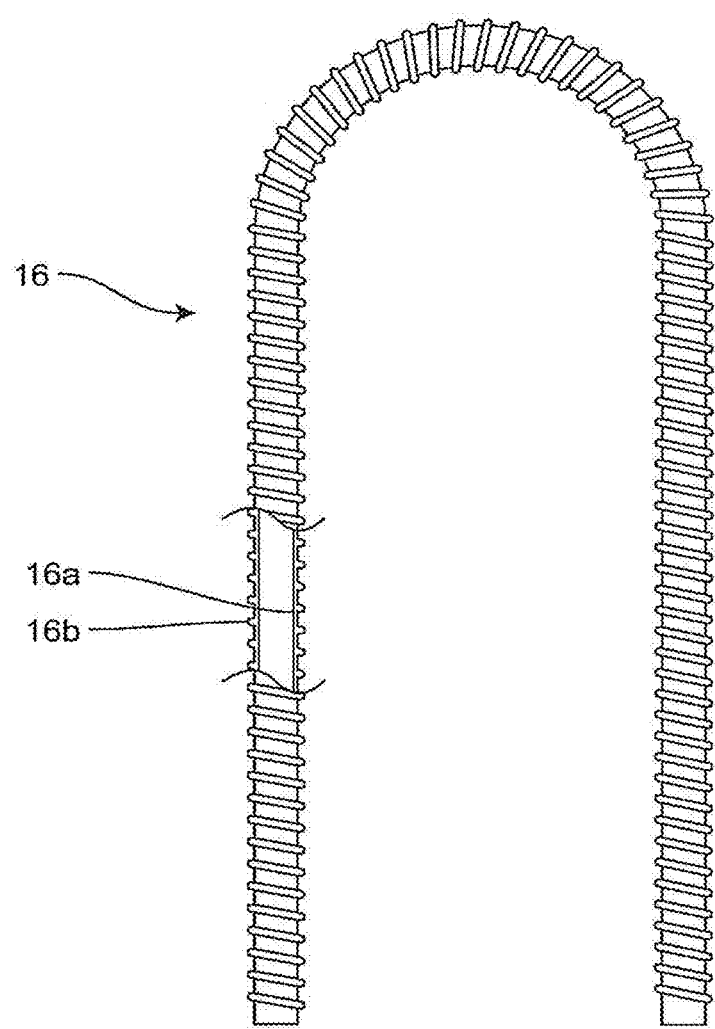
FIG. 12 is a partially cut-away perspective view showing another embodiment of U-shaped tubes which configure the heating portion of the Stirling engine.
Figure 13:
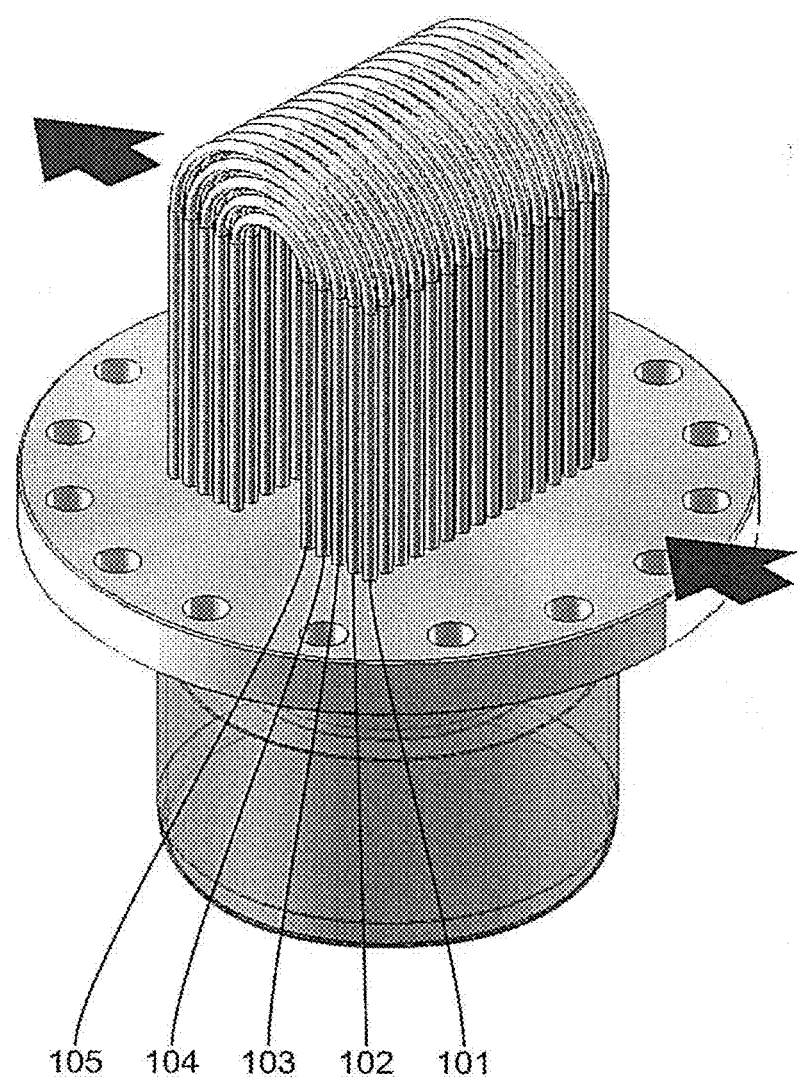
FIG. 13 is a perspective view of an essential portion showing a configuration of the heating portion of the Stirling engine.
Figure 14:
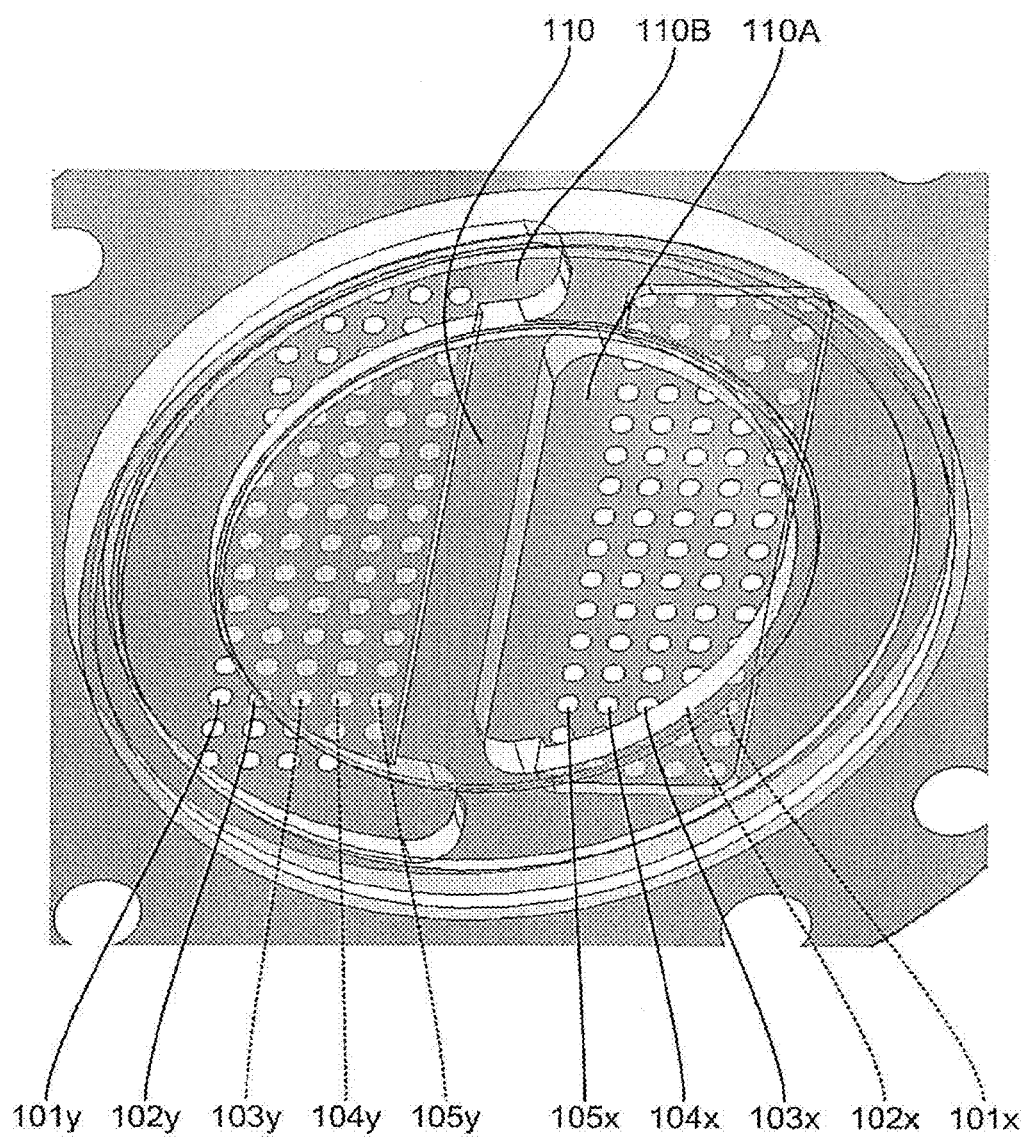
FIG. 14 is a perspective view of a flow passage separating portion of the Stirling engine shown in FIG. 13 as viewed from a side of the heating portion.

FIG. 12 is a partially cut-away perspective view of U-shaped tubes which configure the heating portion of the Stirling engine of this embodiment.

Each off U-shaped tubes 16 of this embodiment includes a smooth circular tube 16a and a corrugated outer tube 16b which is spirally formed around an outer surface of the smooth circular tube 16a. Since operation gas flows through the smooth circular tube 16a, a flow passage resistance is low, heat transfer of a location outside of the tube is promoted, and heat exchanging efficiency can be enhanced.

Although the outer tube 16b is formed into the corrugated spiral shape and the smooth circular tube 16a is formed into a straight tube having no corrugated spiral shape in FIG. 12, operation gas may be made to flow through the outer tube 16b without providing the smooth circular tube 16a. In this case, the heat transfer area is increased by the corrugated spiral shape, operation gas flow is disturbed, Reynolds number is enhanced in a turbulent flow region, the heat transfer is promoted and the heat exchanging efficiency can be enhanced.

Material of the U-shaped tubes which configure the heating portion of the Stirling engine according to the embodiment of the invention will be described below.

In the case of a Stirling engine used under a using environment where exhaust gas temperature is 500° C. or lower, if the U-shaped tube is made of copper having high thermal conductivity, the heat exchanging efficiency can be enhanced. If the U-shaped tube is made of copper, the heating portion head is made of copper or stainless steel. In the case of a Stirling engine used under a using environment where exhaust gas temperature is about 500° C. to 800° C., the U-shaped tube is made of stainless steel to secure strength. When the U-shaped tube is made of stainless steal, the heating portion head is made of stainless steal. When component of exhaust gas under the using environment contains corrosiveness component, U-shaped tube and a heating portion head made of copper or stainless steal are subjected to surface coating such as chromium-based surface coating, ceramic flame spraying (coating) or surface coating using Ni or carbon coating, thereby enhancing endurance. In the case of a Stirling engine used under a using environment where the exhaust gas temperature is 800° C. or higher, e.g., under a using environment of corrosive exhaust gas such as chlorine-based corrosive exhaust gas or corrosive exhaust gas such as nitric acidhydrofluoric acid, if the U-shaped tube is made of titanium or nickel-chromium alloy, reliability and endurance can be enhanced, and a weight of the engine can largely be reduced. Titanium has smaller density as compared with the stainless steal by about 40 to 50%, strength is high and density is smaller and thus, the member can be made thinner as compared with stainless steal, and this is especially suitable for a Stirling engine used in an incinerator and a glass smelting furnace. When the U-shaped tube is made of titanium, the heating portion head is made of stainless steal. In the case of titanium and nickel-chromium alloy, the heating portion head shows excellent welding properties by adjusting welding condition, and the U-shaped tube is inserted into a flue which configures the exhaust gas flow passage.

In this embodiment, the U-shaped tubes 11a, (12, 13) 11b and 11c are disposed such that gaps are formed therebetween with respect to soot such as carbon included in exhaust gas. Therefore, a brush which passes through the gap is prepared, and the brush can easily pass through the gap between the U-shaped tubes. By periodically removing impurities such as soot which adheres to the U-shaped tubes at the time of maintenance, it is possible to recover the heat exchanging efficiency. If an outer surface of the U-shaped tube which comes into contact with exhaust gas is subjected to electrolytic polishing, projections and depressions of the outer tube are lessened and initial heat exchanging efficiency is deteriorated, but since impurities included in exhaust gas are less prone to adhere to the U-shaped tube, the heat exchanging efficiency can be enhanced in the medium-to-long-term forecast in terms of secular change.

Next, a method of removing impurities in a heat-transfer tube group in a power device or a power-generating device which uses a Stirling engine of the invention will be described using FIG. 15.

Figure 15:
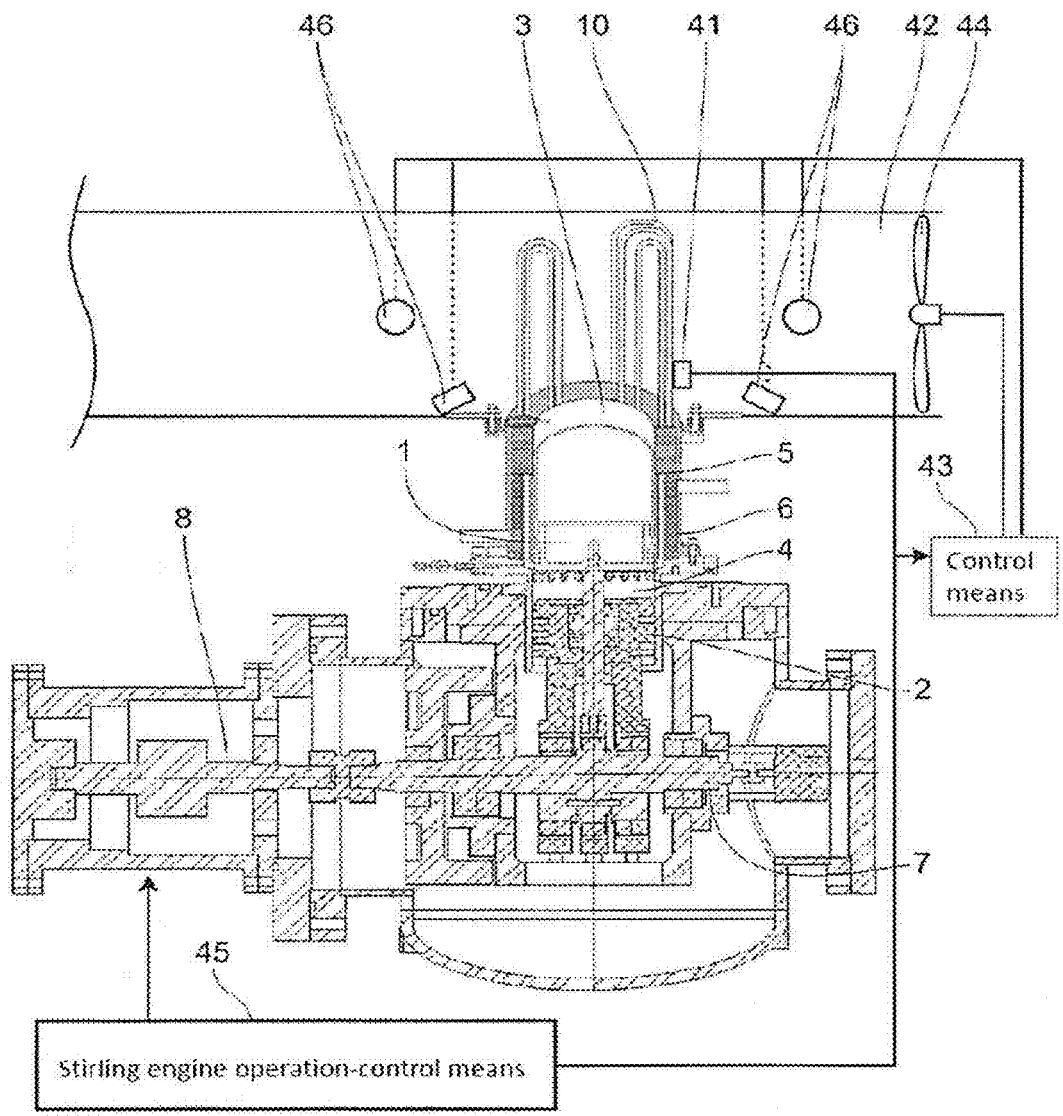
FIG. 15 is a diagram showing a configuration which realizes a Stirling engine and method of removing impurities in a heat-transfer tube group in a power device or a power-generating device which uses a Stirling engine of the invention.

FIG. 15 is a diagram showing a configuration which realizes the method of removing impurities in a heat-transfer tube group in a power device or a power-generating device which uses a Stirling engine of the invention. The method of removing impurities in a heat-transfer tube group which will be described below can be applied even if the heat-transfer tubes do not have a configuration of the invention.

In order to eliminate the need of maintenance which avoid deterioration of heat exchanging efficiency of the heat-transfer tube or to increase the maintenance period, it is necessary to remove impurities of the heat-transfer tube during usage.

In the method of removing impurities in a heat-transfer tubes, detecting means 41 which detects reduction in temperature of the heat-transfer tubes (U-shaped tubes) which become the heating portion 10 and control means 43 which changes a flow rate of exhaust gas in a flue 42 are provided, the detecting means 41 detects reduction in temperature of the heat-transfer tubes, and the flow rate of exhaust gas is temporarily abruptly increased by the control means 43. According to this, impurities adhering to the heat-transfer tubes can be blown away. The control means 43 controls the number of revolutions of air-blowing means 44 or controls a ventilation resistance of the flue 42 as illustrated in the drawing, and the control means 43 may change the flow rate of exhaust gas in the flue 42.

According to this removing method, it is possible to effectively remove impurities which adhere to the heat-transfer tubes if the impurities have relatively weak adhering strength. The detecting means 41 may detect a temperature of the heat-transfer tubes and the high temperature space 3, but it is preferable that the detecting means 41 detects reduction of generated electricity when the method is used for the power-generating device, and the detecting means 41 detects reduction in an output when the method is used for the power device. It is preferable that the control means 43 can be set in a plurality of stages in accordance with a flow rate of exhaust gas to be increased. It is possible to effectively remove impurities by changing a flow rate of exhaust gas to be increased by the control means 43 in accordance with the temperature reduction. It is also effective to provide timer means which sets operation time in the control means 43. The operation for increasing the flow rate of exhaust gas which is carried out by the control means 43 may be completed when the detecting means 41 detects that an amount of reduction in temperature of the heat-transfer tubes falls within a predetermined range.

If impurities which adhere to the heat-transfer tubes have high adhering strength, a removing mode of impurities is carried out using Stirling engine operation-control means 45. As the removing mode of impurities carried out by the Stirling engine operation-control means 45, it is effective to reduce the number of revolutions of the Stirling engine, to stop the operation of the Stirling engine, or reduce the amount of generated electricity at the Stirling engine, thereby rising a temperature of the heater. Reduction in the number of revolutions of the Stirling engine, stop of the operation of the Stirling engine, and reduction in the amount of generated electricity at the Stirling engine can be realized by reducing the number of revolution of the power-generating device or the power device or stopping the power-generating device or the power device by the Stirling engine operation-control means 45.

Further, it is also effective to reversely rotate the Stirling engine using the Stirling engine operation-control means 45, to function the cooling portion 6 as a heating portion and to function the heating portion 10 as a cooling portion. According to the removing mode of impurities by reversely rotating the Stirling engine, the heat-transfer tubes configuring the heating portion 10 becomes the cooling portion, the heat-transfer tubes radiates heat and thus, a temperature at the heat-transfer tubes rises, and impurities which adhere to the heat-transfer tubes can be peeled off. Therefore, it is possible to increase the maintenance period, and to eliminate the need of the maintenance of the heat-transfer tubes depending upon a kind of exhaust gas.

The removing mode of impurities can be carried out by the detecting means 41 which detects reduction in a temperature of the heat-transfer tubes (U-shaped tubes).

The removing mode of impurities may periodically be carried out based on predetermined processing time instead of the detecting means 41 which detects the reduction in temperature of the heat-transfer tubes (U-shaped tubes). A reduction stage of the number of revolutions of the Stirling engine, a stop stage of operation of the Stirling engine, and a reverse rotation stage of the Stirling engine may be set in accordance with adhering strength of impurities, and they may be carried out in stages.

According to the method of removing impurities in a heat-transfer tubes, detecting means 41 which detects reduction in temperature of the heat-transfer tubes (U-shaped tubes) which becomes the heating portion 10, an insertion port 46 which introduces high pressure air or cleaning water into the flue, and control means 43 which instructs to supply the high pressure air or the cleaning water from the insertion port 46 to the heating portion 10 are provided. The detecting means 41 detects reduction in the temperature of the heat-transfer tubes, the control means 43 supplies the high pressure air or the cleaning water to the heating portion 10, and it is possible to remove impurities which adhere to the heat-transfer tubes of the heating portion 10.

As described above, as the removing mode of impurities which is carried out when impurities such as carbon included in exhaust gas flowing through the flue 42 adhere to the heat-transfer tubes, the method of reducing the number of revolutions of the Stirling engine, the method for stopping the operation of the Stirling engine, the method of reducing the amount of generated electricity at the Stirling engine, the method of reversely rotating the Stirling engine, the method for increasing the flow rate of exhaust gas flowing through the flue 42 for predetermined time, and the method for supplying the high pressure air of the cleaning water from the insertion port 46 to the heat-transfer tubes are described above. These methods may be carried out alone or the plurality of methods may be provided.

In this embodiment, entire heating portion head inserts and install into exhaust gas, but it is of course possible to carry out the invention in such a manner that waste heat inserts a solid heat source, i.e., the U-shaped tubes into a thermal insulation which is configured into a high temperature portion, e.g., furnace equipment such as a tunnel furnace formed around the U-shaped tubes by solid heat transfer which is connected to the high temperature portion, thereby recovering energy.

In a combustion type heating furnace such as an apparatus including an electric heater such as a CVD apparatus and a dispersion apparatus used in a semiconductor manufacturing apparatus, an electric furnace used for dissolving such as alumina, and a natural gas, it is preferable to carry out cooling processing using a Stirling engine in a preceding process of a changing process of material or a cooling process. In the CVD apparatus and the dispersion apparatus having the high temperature process, a large amount of holding heat amount in the furnace in the high temperature gas atmosphere in the furnace where exhaust gas does not flow positively, and the furnace is cooled for changing material, the heat-transfer tubes such as the U-shaped tubes is inserted into the furnace instead of cooling by pneumatic transportation, thermal energy is taken into the Stirling engine by heat conduction of high temperature gas caused by the operation gas and according to this, energy can be recovered. In this case, the cooling operation is carried out from a heat-absorbing portion of a heater of the Stirling engine without absorbing heat using operation gas such as outside gas, thereby eliminating a way of escape and according to this, the Stirling engine can absorb heat. Although time required until temperature of the heater portion of the Stirling engine rises becomes slight long due to heat conduction of gas, the Stirling engine can absorb most of the effective heat amount in the furnace, energy can be recovered efficiently, it is easy to control a cooling temperature and excessive cooling operation is not carried out uselessly.

INDUSTRIAL APPLICABILITY

The Stirling engine of the present invention can be utilized as a power-generating device and a power device which makes full use of a heat source such as waste heat and biomass.

The invention claimed is:

1. A method for removing impurities in a heat-transfer tube group in a power device or a power-generating device which uses a Stirling engine, wherein the Stirling engine comprises:
   a displacer piston;
   a power piston;
   a high temperature space and a low temperature space, wherein the high temperature space and the low temperature space are separated by the displacer piston;
   a heating portion disposed at a position opposed to the displacer piston across the high temperature space;
   a regeneration portion and a cooling portion disposed on an outer periphery of the displacer piston; and
   heat-transfer tubes configuring the heating portion disposed in a flue, the method comprising:
   heating and expanding an operation gas in the heat-transfer tubes;
   cooling and contracting the operation gas in the cooling portion; and
   moving the operation gas between the high temperature space and the low temperature space,
   wherein a removing mode of impurities included in exhaust gas which flows through the flue is carried out when the impurities adhere to the heat-transfer tubes,
   wherein the removing mode includes:
      reducing number of revolutions of the Stirling engine without shutdown of an operation of the Stirling engine, reducing an amount of generated electricity at the Stirling engine without shutdown of the operation of the Stirling engine, or reversely rotating the Stirling engine, and
      raising a temperature at the heat-transfer tubes so that the impurities that adhere to the heat-transfer tubes can be peeled off.

2. The method according to claim 1, further comprising: detecting a reduction in temperature of the heat-transfer tubes.

3. A method for removing impurities in a heat-transfer tube group in a power device or a power-generating device which uses a Stirling engine, wherein the Stirling engine comprises:
   a displacer piston;
   a power piston,
   a high temperature space and a low temperature space, wherein the high temperature space and the low temperature space are separated by the displacer piston;
   a heating portion disposed at a position opposed to the displacer piston across the high temperature space;
   a regeneration portion and a cooling portion disposed on an outer periphery of the displacer piston; and
   heat-transfer tubes configuring the heating portion disposed in a flue, the method comprising:
   heating and expanding an operation gas in the heat-transfer tubes;
   cooling and contracting the operation gas in the cooling portion; and
   moving the operation gas between the high temperature space and the low temperature space;
   wherein a removing mode of impurities included in exhaust gas which flows through the flue is carried out when the impurities adhere to the heat-transfer tubes,
   wherein the removing mode includes:
      reducing number of revolutions of the Stirling engine without shutdown of an operation of the Stirling engine, reducing an amount of generated electricity at the Stirling engine without shutdown of the operation of the Stirling engine, or reversely rotating the Stirling engine, raising a temperature at the heat-transfer tubes,
      increasing a flow rate of exhaust gas which flows through the flue for a predetermined time, and
      blowing away the impurities adhering to the heat-transfer tubes.

4. The method according to claim 3, further comprising: detecting a reduction in temperature of the heat-transfer tubes.

5. A method for removing impurities in a heat-transfer tube group in a power device or a power-generating device which uses a Stirling engine, wherein the Stirling engine comprises:
   a displacer piston;
   a power piston;
   a high temperature space and a low temperature space, wherein the high temperature space and the low temperature space are separated by the displacer piston;
   a heating portion disposed at a position opposed to the displacer piston across the high temperature space;
   a regeneration portion and a cooling portion disposed on an outer periphery of the displacer piston; and
   heat-transfer tubes configuring the heating portion disposed in a flue, the method comprising:
   heating and expanding an operation gas in the heat-transfer tubes;
   cooling and contracting the operation gas in the cooling portion;
   moving the operation gas between the high temperature space and the low temperature space; and
   a removing process including:
      reducing number of revolutions of the Stirling engine without shutdown of an operation of the Stirling engine, reducing an amount of generated electricity at the Stirling engine without shutdown of the operation of the Stirling engine, or reversely rotating the Stirling engine, and raising a temperature at the heat-transfer tubes, and introducing cleaning water through an insertion port and providing the cleaning water in the flue so that the cleaning water flows between the heat-transfer tubes and removes the impurities included in exhaust gas which flows through the flue when the impurities adhere to the heat-transfer tubes.

6. The method according to claim 5, further comprising: detecting a reduction in temperature of the heat-transfer tubes.

\* \* \* \* \*